United States Patent
Bischof et al.

(10) Patent No.: US 12,503,854 B2
(45) Date of Patent: Dec. 23, 2025

(54) CONNECTING ELEMENT, REINFORCEMENT AND USE OF A CONNECTING ELEMENT

(71) Applicant: Hilti Aktiengesellschaft, Schaan (LI)

(72) Inventors: Michael Bischof, Lochau (AT); Nadine Sessinghaus, Feldkirch (AT); Jakob Kunz, Grabs (CH); Wolfram Schwertner, Werdenberg (CH)

(73) Assignee: Hilti Aktiengesellschaft, Schaan (LI)

( * ) Notice: Subject to any disclaimer, the term of this patent is extended or adjusted under 35 U.S.C. 154(b) by 211 days.

(21) Appl. No.: 18/280,817

(22) PCT Filed: Mar. 16, 2022

(86) PCT No.: PCT/EP2022/056827
§ 371 (c)(1),
(2) Date: Sep. 7, 2023

(87) PCT Pub. No.: WO2022/207325
PCT Pub. Date: Oct. 6, 2022

(65) Prior Publication Data
US 2024/0151036 A1    May 9, 2024

(30) Foreign Application Priority Data
Mar. 29, 2021    (EP) .................... 21165433

(51) Int. Cl.
*E04C 5/16*    (2006.01)
*C22C 38/00*    (2006.01)

(52) U.S. Cl.
CPC .............. *E04C 5/162* (2013.01); *C22C 38/00* (2013.01); *F16B 2200/77* (2023.08)

(58) Field of Classification Search
CPC ....... E04C 5/162; C22C 38/00; F16B 2200/77
USPC .......................................................... 52/848
See application file for complete search history.

(56) References Cited

U.S. PATENT DOCUMENTS

| | | | | |
|---|---|---|---|---|
| 3,415,552 A * | 12/1968 | Howlett | .................. | E04C 5/165 403/334 |
| 5,067,844 A * | 11/1991 | Bowmer | .................. | E04C 5/165 403/314 |
| 5,411,347 A * | 5/1995 | Bowmer | .................. | E04C 5/165 52/848 |
| 8,502,076 B2 * | 8/2013 | Luzzi | ...................... | H01R 4/72 174/93 |

(Continued)

FOREIGN PATENT DOCUMENTS

| | | |
|---|---|---|
| CN | 207583789 U | 7/2018 |
| CN | 112112784 A | 12/2020 |

(Continued)

OTHER PUBLICATIONS

European Patent Office, International Search Report and Written Opinion in International Application No. PCT/EP2022/056827, mailed Jun. 1, 2023.

*Primary Examiner* — Brent W Herring
(74) *Attorney, Agent, or Firm* — Leydig, Voit & Mayer, Ltd.

(57) ABSTRACT

A connecting element for the force- and/or form-fitting connection of a first component to a second component is provided, having a connecting portion having a shape memory material. Furthermore, a reinforcement and the use of the connecting element is provided.

18 Claims, 2 Drawing Sheets

(56) References Cited

U.S. PATENT DOCUMENTS

| | | | | |
|---|---|---|---|---|
| 11,008,819 | B2* | 5/2021 | Urech | F16L 15/06 |
| 2004/0086330 | A1* | 5/2004 | Gregel | E04G 21/122 |
| | | | | 403/314 |
| 2008/0060175 | A1* | 3/2008 | Barvosa-Carter | B29C 65/66 |
| | | | | 24/442 |
| 2009/0208307 | A1* | 8/2009 | Guyton | B29C 66/126 |
| | | | | 411/379 |
| 2011/0180323 | A1* | 7/2011 | Luzzi | H01R 4/01 |
| | | | | 29/857 |
| 2015/0337659 | A1* | 11/2015 | Fechte-Heinen | E21D 21/0093 |
| | | | | 405/259.1 |
| 2016/0199918 | A1 | 7/2016 | Langbein et al. | |

FOREIGN PATENT DOCUMENTS

| | | | |
|---|---|---|---|
| DE | 10 2019 000 392 A1 | | 7/2020 |
| JP | 07158623 A | * | 6/1995 |
| WO | WO 2020/104290 A1 | | 5/2020 |

* cited by examiner

CONNECTING ELEMENT, REINFORCEMENT AND USE OF A CONNECTING ELEMENT

CROSS-REFERENCE TO RELATED APPLICATIONS

This patent application is the U.S. National Stage of International Patent Application No. PCT/EP2022/056827, filed Mar. 16, 2022, which claims the benefit of European Patent Application No. 21165433.0, filed Mar. 29, 2021, which are each incorporated by reference.

The invention relates to a connecting element for the force- and/or form-fitting connection of a first component to a second component. Furthermore, the invention relates to a reinforcement and to the use of a connecting element.

SUMMARY OF THE INVENTION

In the scope of the present invention, a component can be understood as being a component from the fields of building construction, civil engineering, industrial plant engineering, shipbuilding, steel construction and/or the like. Electronic components may not be encompassed by the term component.

Concrete parts usually need to be provided with a reinforcement. The reinforcement may comprise at least one reinforcing element. Often, there is the problem of connecting one reinforcing element to another.

Hitherto, such a connection generally requires at least one end of the reinforcing element to be worked. In particular, it has hitherto been necessary to form at least one thread or for the end to be upset. These working operations are associated with significant effort and frequently require heavy and costly equipment. A drawback with solutions with a thread is furthermore that the reinforcing element often has to be rotated during fitting.

A further alternative resides in the use of a connecting element which needs to be pressed to connect the components to be connected. The pressing tools required for this are often very heavy, however, and are usable only with great difficulty or sometimes even not at all under the often constrained conditions.

Therefore, it is an object of the present invention to provide means which allow one component to be connected to another in a simple and yet secure manner.

The object is achieved by a connecting element for the force- and/or form-fitting connection of a first component to a second component, comprising a connecting portion having a shape memory material.

A shape memory material can be a material which, starting from a starting geometry, as a result of an activation process, has a tendency to reshape itself automatically into a target geometry. In the following text, this tendency is referred to as the shape memory effect. Particularly preferably, the starting geometry and/or the target geometry can be impartable on an element made from the shape memory material. Whether the target geometry is actually achieved can depend here on external circumstances, in particular on external geometric constraints. Preferably, the shape memory material is configured, in the case of a constraint that prevents the achievement of the target geometry, to exert corresponding forces and/or pressures on a body creating the constraint.

The invention is based on the idea of allowing tool-free or at least largely tool-free fitting by exploiting the shape memory effect. In particular, the shape memory effect can replace otherwise necessary pressing of the connecting portion by means of a pressing tool. A user of the connecting element thus only needs to activate the connecting element and in particular the shape memory material, this being able to be particularly simple compared with the previously conventional use of equipment or power tools. The activation can also take place at locations that are difficult to reach.

In order to establish the desired connection between the two components, all that is required is a small amount of preliminary work that is able to be carried out quickly. Therefore, in particular when a large number of connections are intended to be established, particularly high productivity can be achieved.

Since the shape memory effect is an intrinsic tendency of the shape memory material, operating errors on the part of the user, for example pressing too weakly or pressing at unsuitable points of the connecting element, can be largely ruled out, and so the establishment of a connection between the two components can take place particularly reliably.

The shape memory material may be thermally activatable. In particular, it can be designed to be activated by brief heating, for example in the region of a few seconds, for example in the range from 5 seconds to 50 seconds, in particular starting from a normal temperature.

In this case, it is particularly advantageous when the shape memory material has an activation temperature above room temperature, preferably above 100° C., particularly preferably above 140° C. and more preferably at least up to 170° C. It can thus be activatable by being heated up to a temperature above a normal room temperature, preferably above 100° C., particularly preferably above 140° C. and more preferably at least up to 170° C. Even activation at a temperature of about 200° C. is conceivable. The normal room temperature can in this case correspond to the above-mentioned normal temperature. It can preferably be in the range between 5° C. and 25° C., for example 20° C. The connection can thus be established at normal ambient temperatures.

In one class of embodiments, the shape memory material may be magnetically activatable such that, for activation, it is sufficient to bring a magnet, for example a bar magnet, into the vicinity of the shape memory material. Such activation is particularly easily possible even under very different ambient conditions, for example even with high humidity.

The shape memory material may comprise an iron-based shape memory alloy. Such an iron-based shape memory alloy may contain for example iron and manganese, silicon, chromium and/or nickel. [Here possibly mention a preferred alloy with alloy contents]. Such iron-based shape memory alloys are sufficiently and cost-effectively available. Their shape memory effect can bring about relatively high clamping forces and/or clamping pressures. They may be thermally activatable, in particular at temperatures above room temperature.

Multifarious possible uses, in particular in the field of building construction and/or civil engineering, arise when the connecting portion is configured to receive a reinforcing element, for example a reinforcing bar.

Preferably, at least the connecting portion can be sleeve-like. The connecting portion can thus have two open ends. The components to be connected can then be introduced at least with in each case one of their ends into in each case one of the open ends. Particularly preferably, the entire connecting element is sleeve-like, such that the connecting element takes up relatively little space in order to establish the connection.

Such a sleeve shape is particularly suitable for the straight connection of the two components to be connected. For example, a rod-like reinforcing bar can thus be extended by a second rod-like reinforcing bar. Other, preferably tubular shapes are also conceivable. Thus, the connecting element can be in the form of an angled tube for connecting two components across a corner. It can also be T-shaped or cruciform, in particular in the form of a T-shaped or cruciform tube, in order to connect three or, respectively, four components to one another.

In general, the connecting element can be designed to connect two or more components to one another. To this end, the connecting element, in particular the connecting portion, can have an appropriate number of open ends.

Particular preference is given to embodiments of the invention in which the connecting portion has at least one cone, in particular an internal cone. Preferably, the connecting portion can have at least two cones, in particular a cone at both ends. It can circumferentially enclose at least one of the components. The smallest inside diameter of the cone can be equal or substantially equal to a typical diameter of a component, or of an end thereof, to be introduced into the connecting portion.

The cone makes it possible to introduce the component, in particular the end thereof to be introduced, into the connecting portion without play or substantially without play. This allows a force-fit with particularly high clamping forces or clamping pressures. In addition, the clamping forces or clamping pressures can be introduced uniformly; local stress peaks acting on the component to be introduced can thus be avoided. The cone also allows particularly diverse use of the connecting element, in particular for different kinds and/or sizes of components.

In general, one or more of the open ends of the connecting portion can be provided with an internal cone.

A design feature for setting the achievable clamping stresses or clamping pressures arises from the slope of the cone, in particular depending on the shape memory material used.

In this case, a cone slope of at most 10%, preferably at most 5%, in particular at most 3%, particularly preferably at most 2%, has proven to be particularly favourable. In order to achieve a sufficient action of the conical shape, the cone slope may also be at least 0.1%, in particular at least 0.5%.

A further design feature resides in the length of the cone. The length of the cone can be chosen in particular depending on the type of at least one of the components to be connected. Here, it is possible to take into account that conventional components exhibit tolerances, in particular with regard to the thickness and/or a diameter of an end to be introduced. The length can in particular be such that, even in the case of a component at the limit of admissible tolerances, a residual clamping length necessary for creating a sufficient clamping stress or sufficient clamping pressure is still available.

Preferably, the connecting element, in particular its connecting portion, can also be designed such that the clamping force of the activated connecting portion is greater than an, in particular typical and/or maximum tensile strength of at least one of the components to be connected. To this end, the connecting element can be designed to connect one or more classes of component. This can be achieved in particular with cone slopes of between 0.5% and 1%.

The connecting objectives mentioned at the beginning are achieved in particular in the case of reinforcements, in particular for reinforcing concrete. An advantageous class of connecting elements can therefore be designed to connect, as first component, a reinforcing element to the second component, which may preferably likewise be a reinforcing element. The reinforcing element may be for example a reinforcing bar.

As indicated above, at least for certain shape memory materials, the activation can take place thermally. If these shape memory materials are electrically conductive, they can be electrically heated particularly simply and as a result activated. It is also conceivable for the user of the connecting element to use a battery-operated and/or grid-operated activation device for activation. The activation device can be designed to generate an electric current in the connecting element, in particular in the connecting portion. To this end, the activation device can be designed to generate an electric voltage between two different points of the connecting element. Alternatively or in addition, the activation device can be designed to generate the electric current by induction.

If at least the connecting portion is electrically insulated, the electric heating can be focused on the shape memory material to be activated. The electrical insulation can additionally reduce or avoid corrosive effects. The electrical insulation can be formed in the region of contact faces of the connecting element, in particular of the connecting portion, with which the connecting element comes into contact with the connected-together components. In the case of a sleeve-like connecting portion, this can be in particular an inner side of the connecting portion.

The form-fit and/or the force-fit can be improved when the connecting portion, in particular an inner side of the connecting portion, has a structured surface portion. The structured surface portion can additionally be formed so as to be complementary or substantially complementary to the surface of at least one of the components to be connected or at least the end thereof to be introduced. In general, the structured surface portion can be rough.

In order to avoid preliminary work on site, for example on a construction side, the connecting element, in particular the connecting portion thereof and in this case at least the shape memory material, can be pre-elongated. A sleeve-like connecting portion can additionally be radially expanded, i.e. its diameters can be increased. Such a pre-elongated state can correspond to the starting geometry. Following activation, the shape memory material thus tends to adopt, as target geometry, a tighter geometry such that components located in the connecting portion are connected by a form- and/or force-fit.

The scope of the invention furthermore covers a reinforcement, in particular for reinforcing a concrete part, comprising a reinforcing element on which a connecting element according to the invention is arranged. A second component, in particular a second reinforcing element, can be attached to such a reinforcement in a particularly simple and secure manner in that the second component is introduced into the connecting portion of the connecting element and subsequently the shape memory material of the connecting portion is activated.

The invention furthermore encompasses the use of a connecting element, which has an iron-based shape memory alloy, for the force- and/or form-fitting connection of two components, in particular at least one reinforcing element and a further component. The further component can be a second reinforcing element. By way of the reinforcing elements, at least one reinforcement, in particular for reinforcing a concrete part, can be producible and/or produced.

To this end, in particular one of the above-described connecting elements according to the invention can be used.

If a connecting element having an iron-based shape memory alloy is used, the iron-based shape memory alloy can be heated for activation to at least 100° C., preferably to 130° C. to 230° C., particularly preferably 160° C. to 200° C.

Overheating, for example considerably above 200° C., for example above 250° C., depending on the shape memory material, can be avoided in order not to reduce or not to significantly reduce the achievable clamping forces or clamping pressures.

Particular preference is given to the use in which the shape memory material, in particular the iron-based shape memory alloy, is activated physically, in particular by an electric current and/or by a change of phase, chemically, in particular by a heat-generating chemical reaction, and/or by a hot substance, in particular a hot gas. For physical heating by means of a change of phase, a charged or at least chargeable latent heat store can be arranged and/or arrangeable on the connecting element. To activate the shape memory material, the previously charged latent heat store can be activated, for example by a mechanical pulse, such that heat for activating the shape memory material is released. For chemical, in particular thermochemical activation, chemically active material, for example a thermite mixture, can be arranged and/or arrangeable on the connecting element. A reaction associated with the chemically active material can be initiated in order in this way to in turn activate the shape memory material. In particular when a highly exothermic material, for example the thermite mixture, is used, a form-fit may be able to be established in addition to or instead of the force- and/or form-fits.

Activation by electric current can take place using the above-described activation device, in particular by applying a voltage and/or inductively. Activation by hot gases can take place by using the hot exhaust gases generated by a gas burner.

The use can take place on a construction site, in particular a building construction site and/or a civil engineering construction site.

For use, the shape memory material can be pre-elongated and/or prestressed before being activated.

The use can take place at ambient temperatures in the range between −50° C. and 50° C., in particular at 5° C. to 25° C.

Further features and advantages of the invention emerge from the following detailed description of exemplary embodiments of the invention, with reference to the figures of the drawing, which shows details essential to the invention, and from the claims. The features shown there are not necessarily to be understood as true to scale and are shown in such a way that the special features according to the invention can be made clearly visible. The various features can be implemented individually in their own right or collectively in any combination in variants of the invention.

BRIEF DESCRIPTION OF THE SEVERAL VIEWS OF THE DRAWINGS

In the schematic drawing, exemplary embodiments of the invention are shown and explained in more detail in the following description.

DESCRIPTION OF THE EMBODIMENTS

In order to make it easier to understand the invention, the same reference signs are used in each case for identical or functionally corresponding elements in the following description of the figures.

Figure 1:
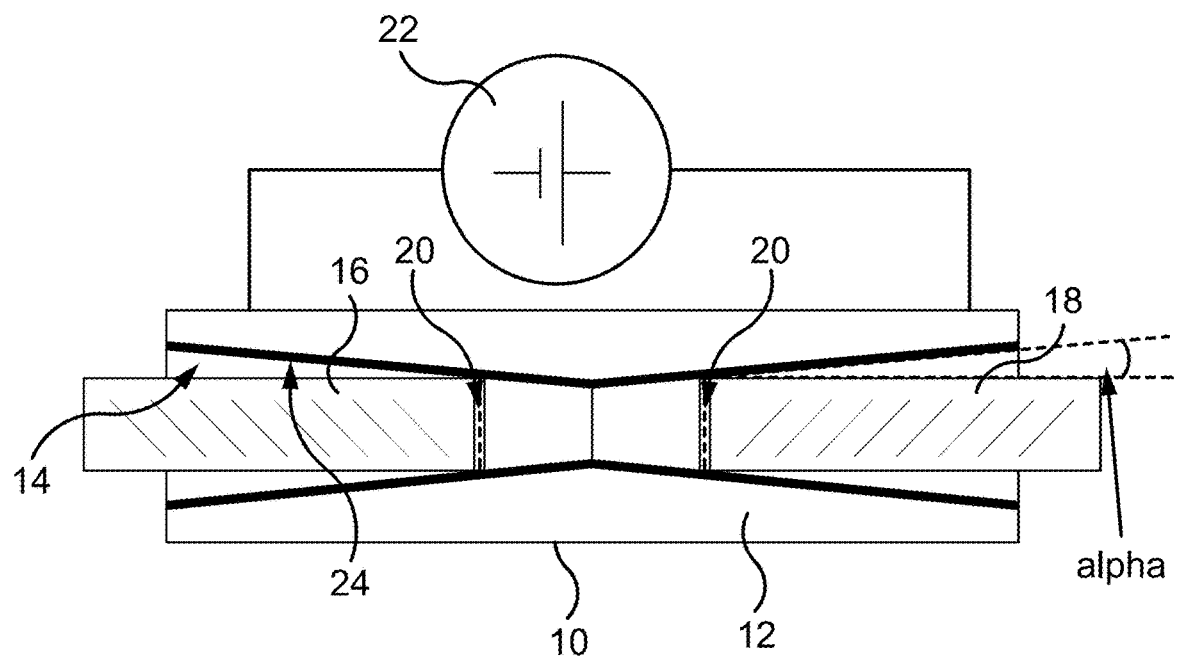
FIG. 1 shows a schematic cross-sectional view of a connecting element before activation, into which two components to be connected to one another have been introduced.

FIG. 1 shows a schematic cross-sectional view of a connecting element 10 having a connecting portion 12. In this exemplary embodiment, the connecting portion 12 corresponds to the entire connecting element 10.

The connecting element 10 and thus also the connecting portion 12 are sleeve-like. Extending toward the two open ends of the connecting portion 12, internal cones 14 have been incorporated. The internal cones 14 have cone slopes alpha of about 2%.

The connecting portion 12 is made from an iron-based shape memory alloy, in particular of the Fe—Mn—Si type, particularly preferably of the Fe—Mn—Si—Cr—Ni type.

As is explained in more detail in connection with FIG. 3, the connecting portion 12 is pre-elongated in the state according to FIG. 1. In particular, the connecting portion 12 has been radially expanded. The expansion and thus pre-elongation can take place for example by means of conical punches (not illustrated in FIG. 1), which are pressed into the internal cones 14. Preferably, a lubricant is used in order for it to be possible, following the expansion and the associated partially plastic deformation of the connecting portion 12, to remove the punches from the connecting portion 12 again. The pre-elongation can in this case take place at a normal room temperature, for example 20° C.

Introduced into the internal cones 14 are a first component 16 and a second component 18 in order to be connected to one another. It is apparent that the components 16 and 18 each come into contact with the internal cones 14 and thus the connecting portion 12 in starting contact regions 20. On account of the conical design of the connecting portion 12, it is thus possible for very different kinds of components and in particular components with different sizes to be introduced into the connecting portion 12, such that the components can always come into contact internally with the connecting portion 12 radially or at least substantially radially in spite for example of different diameters.

The state according to FIG. 1 represents the state of the connecting element 10 at the start of the production of an at least force-fitting connection between the two components 16 and 18. In this case, the connecting element 10 and thus also the connecting portion 12 can be at a normal temperature, for example the prevailing ambient temperature, for example in the range between 5° C. and 25° C.

In order to establish a force-fit and, depending on the geometry of the components 18, optionally a form-fit between the two components 16 and 18, the iron-based shape memory material needs to be activated. In this exemplary embodiment, the iron-based shape memory alloy is activatable by heating starting from room temperature. In particular, it is necessary to heat the shape memory alloy above 100° C., for example to an activation temperature of 160° C.

The iron-based shape memory alloy is also electrically conductive. Therefore, an activation device 22, which is only schematically illustrated in FIG. 1, can be electrically connected to the connecting element 10 and in particular to the connecting portion 12 formed from the iron-based shape memory alloy. The activation device 22 has a power source, for example a rechargeable battery, in particular a lithium-based rechargeable battery. It is designed to allow an electric current, preferably a pulse of current with a duration in the region of seconds or a few minutes, to flow in the connecting portion 12 connected to it. In this way, the iron-based shape memory alloy can be heated until it is activated. The activation device 22 is also designed to automatically switch off after the activation temperature is reached, for example by means of a temperature sensor and/or by means of monitoring the current generated and the electric voltage applied, such that overheating is avoided. Following activation, the activation device 22 can be detached from the connecting element 10 again.

The connecting portion 12 can preferably be internally lined, in particular in the region of the internal cones 14, with an insulating coating 24, for example an electrically insulating varnish. The current generated by the activation device 22 thus flows only through the connecting element 10 and in particular through the iron-based shape memory alloy contained therein.

On reaching the activation temperature, the iron-based shape memory alloy is activated such that it tends to deform into its target geometry, in this case the state prior to pre-elongation of the connecting portion 12.

Figure 2:
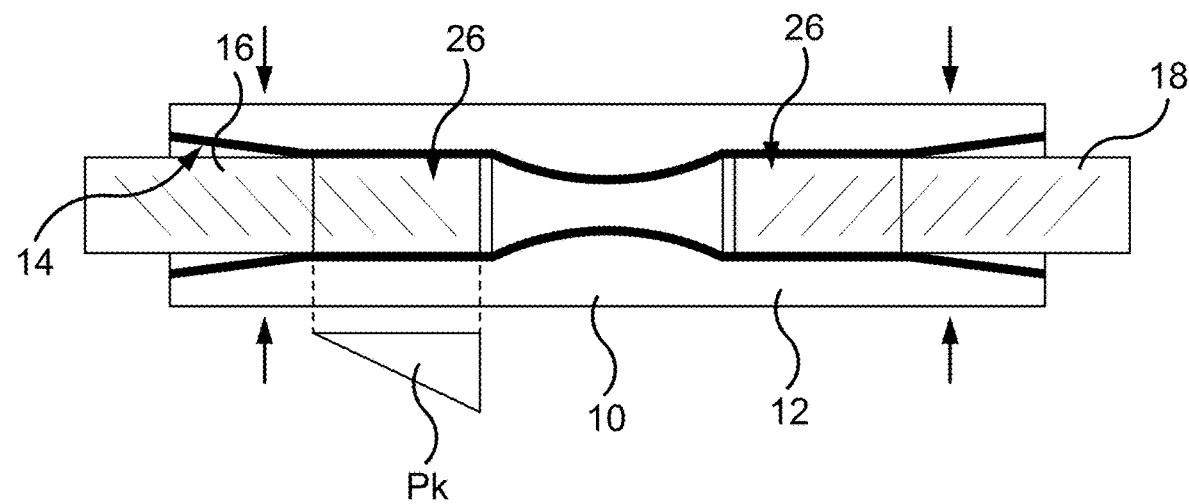
FIG. 2 shows a schematic cross-sectional view of the connecting element with the two components after activation.

The connecting element 10 and in particular the connecting portion 12 thus start to radially shrink until they reach the state according to FIG. 2.

It is apparent from FIG. 2, in which again a schematic cross-sectional view is depicted, that the connecting portion 12 comes into contact with the components 16 or 18, respectively, as a result of its shrinkage in the region of clamping contact regions 26. Depending on the original spacing of the inner side of the connecting portion 12 or of the internal cones 14, clamping pressures Pk are developed in the process. In this exemplary embodiment, the clamping pressures Pk can be up to 500 MPa. In FIG. 2, a triangle symbolically illustrates that the clamping pressures Pk increase linearly or at least substantially linearly toward the inside and thus no local stress peaks occur, which could damage the components 16 or 18.

Thus, the components 16 and 18 are each connected to the connecting portion 12 by clamping and thus also to one another at least by way of a force-fit.

If the components 16 and/or 18 do not have smooth surfaces, for example have ribbed surfaces, one or more rear engagements of the connecting portion 12 can occur to some extent, such that, depending on the components 16 and/or 18 to be connected, form-fits can also be formed in addition to the force-fits.

Figure 3:
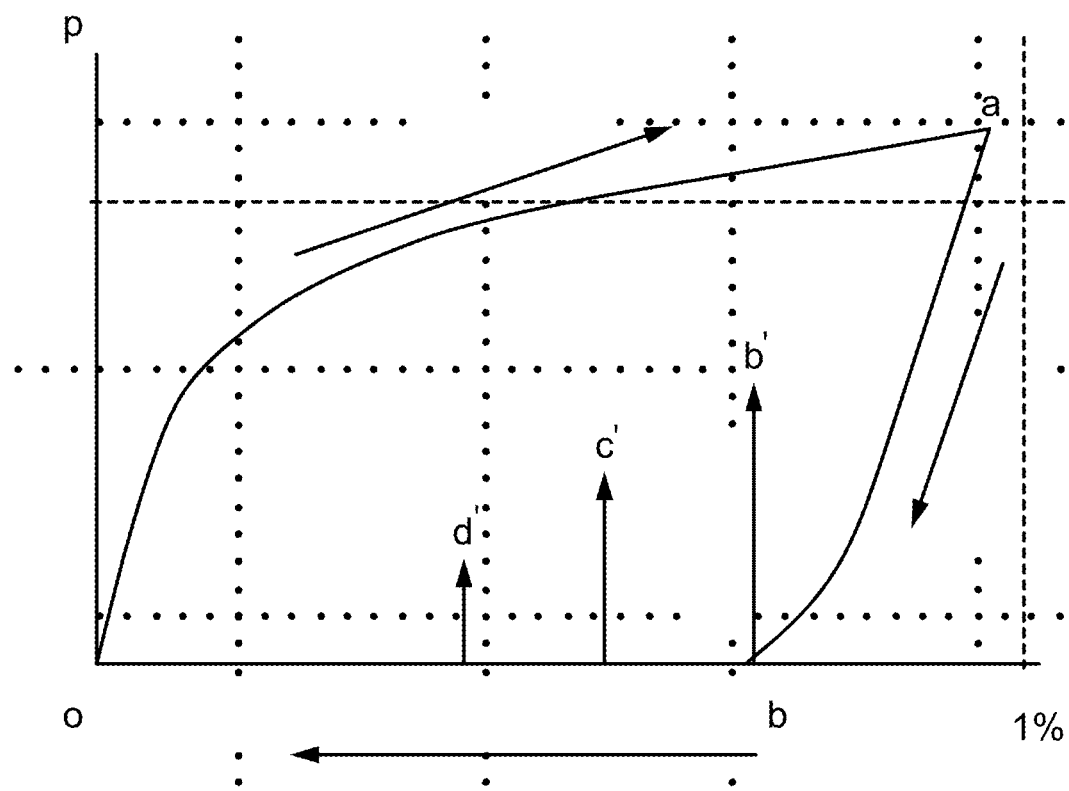
FIG. 3 shows a pressure/elongation diagram for illustrating the use of the connecting element.

FIG. 3 will now be used to explain in more detail the use of the connecting element 10, which has an iron-based shape memory alloy, for the force- and/or form-fitting connection of the two components 16 and 18.

In the diagram according to FIG. 3, the stresses p prevailing in the shape memory material are plotted versus its relative elongation 1%.

Starting from the non-pre-elongated, non-prestressed shape memory material (point 0), the shape memory material, and in particular thus the sleeve-like connecting portion 12 (FIG. 1), is pre-elongated by means of the conical punches. The sleeve-like connecting portion 12 is thus elongated radially until it achieves a maximum relative elongation 1% at the point a. Now, the punches are removed.

As a result, spring-back in the order of magnitude of up to about 1%, preferably of up to 0.5%, occurs, such that a pre-elongation in the order of magnitude in the region of about 2.5% to 6.5% remains.

Then, the components 16 and 18 (FIG. 1) are introduced into the connecting portion 12 until they come into contact with the connecting portion 12 according to the point b, at least in the starting contact regions 20 (FIG. 1). It should be noted that the spring-back does not result in complete regression of the elongation.

Subsequently, the shape memory material is activated by heating at least up to the activation temperature, for example up to 160° C. The shape memory material thus tends, on the basis of its inherent shape memory effect, to pass back into the initial state and thus also the target state according to point 0.

It is prevented from returning entirely, however, on account of the components 16 and 18. Depending on the original distance between the respective portion along the components 16 and 18 and the connecting portion 12, a partial reduction in the relative elongation 1% occurs, with the result that the connecting portion 12 fits snugly against the respective component 16 or 18. Depending on the extent of residual relative elongation 1%, different clamping pressures Pk (FIG. 2) arise, which, at most, corresponding here to the point b', can amount for example to up to 500 MPa depending on the shape memory material. The points c', d' accordingly represent states with a lower residual relative elongation 1% and accordingly lower clamping pressures Pk.

In this state, i.e. substantially the state according to FIG. 2, the components 16 and 18 are thus fixed to the connecting element 10 with sufficiently high clamping pressures Pk overall and thus securely connected to one another. Sufficiently high clamping pressures Pk can be considered in particular to be clamping pressures Pk, the surface integral of which over the clamping contact regions 28 corresponds to a clamping force at which the component 16 or 18 in question is fixed to the connecting element 10 with a retaining force which corresponds at least to a breaking force, in particular a tensile breaking force, of the component 16 or 18. This can mean that the connection at least between the connecting element 10 and the component 16 or 18 exhibits greater tensile strength than the component 16 or 18 itself.

Figure 4:
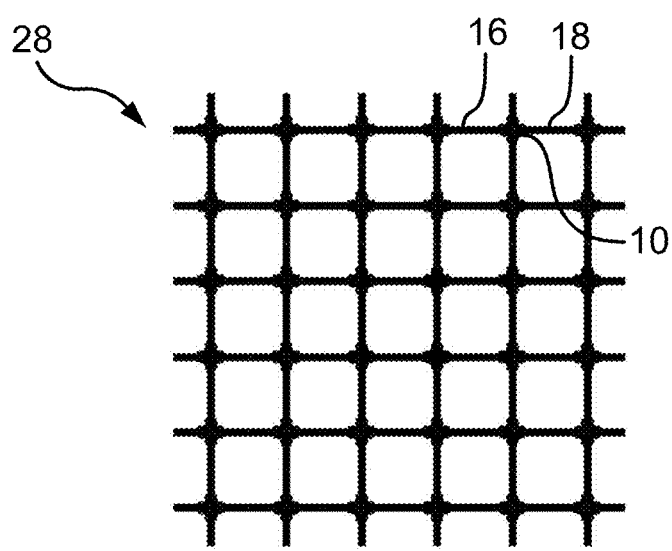
FIG. 4 shows a reinforcement.

Finally, FIG. 4 shows a reinforcement 28. The reinforcement 28 is designed to reinforce a concrete part to be produced. It has a multiplicity of components in the form of rod-like reinforcing bars, of which, by way of example, a first component 16 and a second component 18 are labeled with reference signs.

The components, i.e. the reinforcing bars, are connected to one another by connecting elements, of which again, by way of example, one connecting element 10 is provided with a reference sign. These connecting elements substantially correspond in terms of structure and function to the connecting elements 10 described above in relation to FIG. 1, FIG. 2 and FIG. 3. They have, for example, the special feature of being cruciform. In this example, they can thus connect up to four different components to one another by means of their four open ends by way of force- and/or form-fits.

Overall, the reinforcement 28 thus has a matrix-like structure

The invention claimed is:

1. A connecting element for a force- and/or form-fitting connection of a first component to a second component, comprising a connecting portion having a first open end and a second open end and a shape memory material, wherein the connecting portion has at least one cone at the first open end or the second open end, wherein the at least one cone is an internal cone having an internal cone slope (alpha) of at most 10%, the internal cone slope becoming narrower in a direction away from the first open end or the second open end.

2. The connecting element as claimed in claim 1, wherein the shape memory material has an activation temperature above room temperature.

3. The connecting element of claim 2, wherein the shape memory material has an activation temperature above 100° C.

4. The connecting element as claimed in claim 1, wherein the shape memory material is magnetically activatable.

5. The connecting element as claimed in claim 1, wherein the shape memory material is an iron-based shape memory alloy.

6. The connecting element as claimed in claim 1, wherein the connecting portion is configured to receive a reinforcing element.

7. The connecting element of claim 6, wherein the reinforcing element is a reinforcing bar.

8. The connecting element as claimed in claim 1, wherein the connecting portion is sleeve-like.

9. The connecting element as claimed in claim 1, wherein the cone slope (alpha) is at least 0.1%.

10. The connecting element as claimed in claim 1, having a clamping force of an activated connecting portion that is greater than a tensile strength of at least one of the first and second components to be connected.

11. The connecting element as claimed in claim 1, wherein the connecting element is designed to connect, as the first component, a reinforcing element to the second component.

12. The connecting element as claimed in claim 1, wherein the connecting portion has a structured surface portion.

13. A reinforcement, comprising a reinforcing element on which a connecting element as claimed in claim 1 is arranged.

14. The connecting element as claimed in claim 1, wherein the at least one cone is at the first open end, the at least one cone internal cone slope becoming narrower in a direction away from the first open end, and the connecting portion has an additional cone at the second open end, wherein the additional cone is an internal cone having an internal cone slope (alpha) of at most 10%, the internal cone slope of the additional cone becoming narrower in a direction away from the second open end.

15. A method of connecting a first component to a second component, the method comprising a force- and/or form-fitting connection of the first component to the second component by a connecting element having an iron-based shape memory alloy, wherein the connecting element has at least one cone at a first open end or a second open end of the connecting element, wherein the at least one cone is an internal cone having an internal cone slope (alpha) of at most 10%, the internal cone slope becoming narrower in a direction away from the first open end or the second open end.

16. The method of claim 15, wherein the connecting element comprises a connecting portion having the iron-based shape memory alloy.

17. The method of claim 15, including heating the iron-based shape memory alloy for activation to at least 100° C.

18. The method of claim 15, including physically activating the iron-based shape memory alloy.

* * * * *